March 22, 1960 D. C. HAMMAN 2,929,426
PREASSEMBLED FASTENER UNIT ADAPTED FOR USE WITH SOFT MATERIAL
Filed July 11, 1956
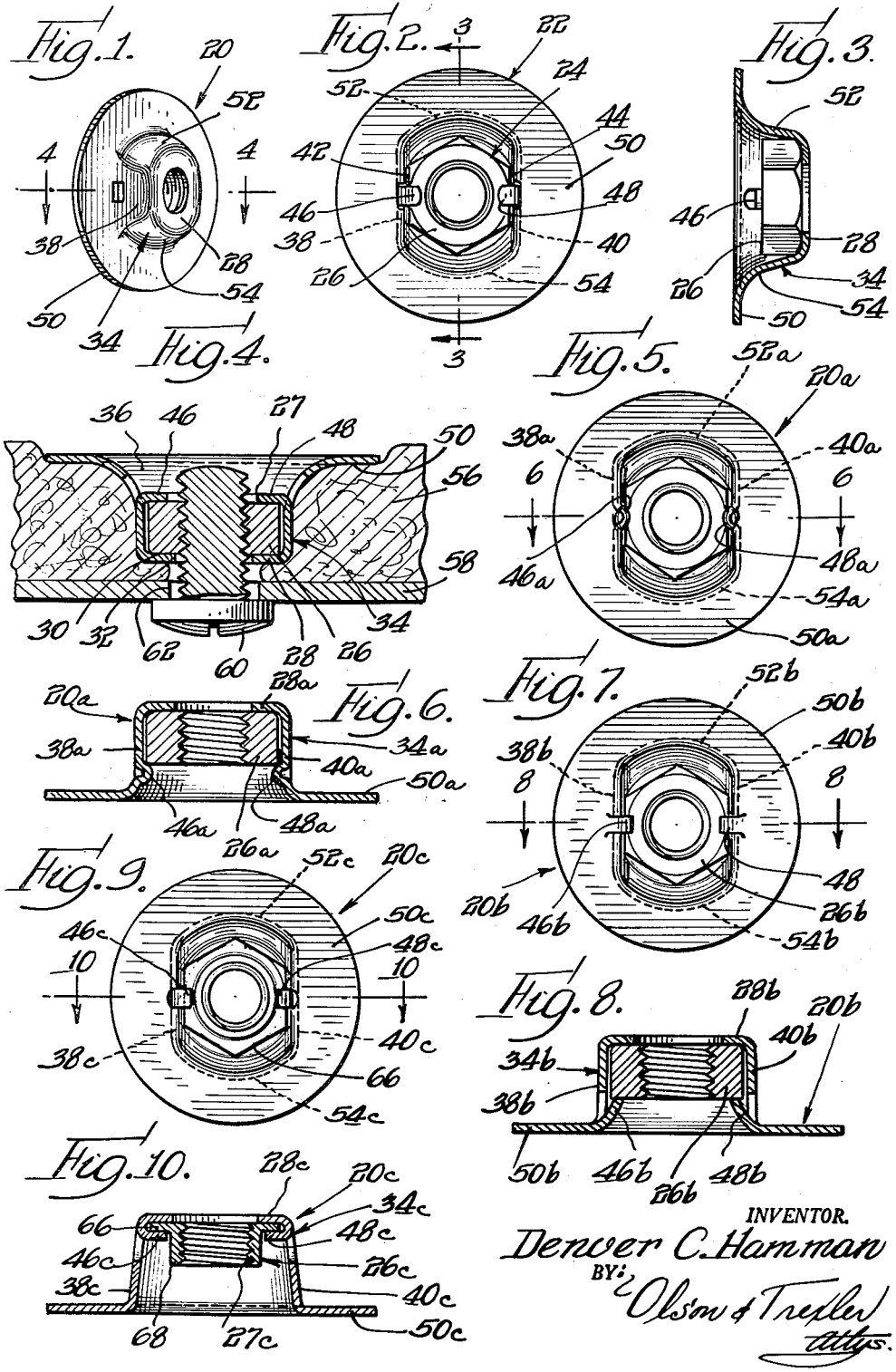
INVENTOR.
Denver C. Hamman
BY Olson & Trexler
attys.

United States Patent Office 2,929,426
Patented Mar. 22, 1960

2,929,426

PREASSEMBLED FASTENER UNIT ADAPTED FOR USE WITH SOFT MATERIAL

Denver C. Hamman, Palatine, Ill., assignor to Illinois Tool Works, Chicago, Ill., a corporation of Illinois Application July 11, 1956, Serial No. 597,157

5 Claims. (Cl. 151—41.73)

The present invention relates to novel fastening means and, more particularly, to a novel preassembled helically threaded fastener unit and a washer therefor.

There are many structures wherein it is desired to secure a workpiece or mass of relatively soft material to another workpiece. For example, mats of fibrous insulating material are frequently secured to sheet metal panels or the like. An important object of the present invention is to provide a novel fastener unit including a novel washer and a threaded fastener member for securely retaining a workpiece of relatively soft material without injury thereto upon being engaged by a complementary threaded fastener element and drawn or clamped against the relatively soft workpiece.

A more specific object of the present invention is to provide a novel fastener unit including a threaded fastener member and a novel washer, which unit is formed so as to resist rotation relative to a workpiece during application of a complementary threaded fastener element to the unit, whereby to facilitate application of the complementary fastener element and to reduce any possibility of injuring the workpiece.

A further object of the present invention is to provide a novel fastener unit of the above described type wherein the threaded fastener member of the unit is retained against rotation so as to facilitate application thereto of a complementary threaded fastener element from one side of a work structure.

Still another object of the present invention is to provide a novel fastener unit of the above described type which is constructed so that when it is fully applied to a relatively soft workpiece, there will be substantially no objectionable projecting element extending beyond a surface of the relatively soft workpiece.

Still another object of the present invention is to provide a novel fastener unit of the above described type wherein the washer and threaded fastener member are connected in preassembled relationship in a simple and secure manner.

A further object of the present invention is to provide a novel preassembled fastener unit of the above described type which is of simple construction and may be easily and economically manufactured.

Other objects and advantages of the present invention will become apparent from the following description and the accompanying drawings wherein:

Fig. 1 is a perspective view showing the clamping side of a fastener unit incorporating the features of the present invention;

Fig. 2 is an outer end view of the novel fastener unit;

Fig. 3 is a partial sectional view taken along line 3—3 in Fig. 2;

Fig. 4 is a sectional view of the novel fastener unit taken along line 4—4 in Fig. 1 and further showing the unit applied to a work structure;

Fig. 5 is an outer end view of a modified fastener unit embodying features of the present invention;

Fig. 6 is a sectional view taken along line 6—6 in Fig. 5;

Fig. 7 is an outer end view of another modified form of the present invention;

Fig. 8 is a sectional view taken along line 8—8 in Fig. 7;

Fig. 9 is an outer end view of a further modified form of the present invention; and Fig. 10 is a sectional view taken along line 10—10 in Fig. 9.

Referring now more specifically to the drawings wherein like parts are designated by the same numerals throughout the various figures, a fastener unit 20 embodying one form of the present invention is shown in Figs. 1 through 4. The unit 20 comprises a one-piece sheet material washer 22 preferably formed from sheet metal and a threaded fastener member 24. In the embodiment illustrated the fastener member 24 is in the form of a nut having a non-circular and conveniently hexagonal body 26 provided with a central aperture which is defined by helical thread convolutions 27.

The washer 22 includes a radially inwardly extending flange 28 disposed along a radially extending annular clamping side or face 30 of the nut body 26 and having a central aperture 32 substantially axially aligned with the nut body. An intermediate hollow body section 34 of the washer is integrally joined to the outer margin of the flange 28 and extends generally axially from the clamping side of the nut body toward and beyond the opposite side of the nut body. It is to be noted that the axial extent of the washer body section 34 is substantially greater than the axial extent of the nut body 26 so that the periphery of the nut body is completely surrounded by the washer and the nut body is housed well within a hollow or recess 36 defined by the washer body section 34. It is further to be noted that a pair of opposite side portions 38 and 40 of the washer body section 34 are preferably substantially flat and are disposed so that they are parallel to each other and to the axis of the fastener unit. These substantially flat side portions 38 and 40 are spaced apart a distance only slightly greater than the distance between opposite substantially flat peripheral surface sections 42 and 44 of the nut body so that the side portions 38 and 40 and the surface sections 42 and 44 interengage for preventing relative rotation between the washer and the nut body. The side portions 38 and 40 also serve to restrain rotation of the washer relative to a work structure when the fastening unit is applied to the work structure in the manner described below.

The fastener body 26 and the washer 22 are retained in preassembled relationship. Thus, after the fastener body is inserted into the recess 36 and against the flange 28, fingers or tabs 46 and 48 are respectively struck from the side portions 38 and 40 of the washer for retaining the fastener body. In this embodiment, these fingers or tabs extend from integral junctions with the side portions 38 and 40 adjacent the outer end or side of the fastener body, and the fingers or tabs are bent so that they extend radially inwardly over the outer side of the nut body 26 in the manner shown.

The outer end of the washer body section 34 integrally merges with a relatively large and substantially radially outwardly extending annular peripheral flange 50. This flange serves to spread the clamping pressure of the fastening unit over a large area of the work structure so as to minimize injury to the work structure. It is to be noted that opposite side portions 52 and 54 of the washer body section 34 between the above mentioned opposite side portions 38 and 40 are curved and are flared outwardly from the inner end flange 28. These side portions 52 and 54 serve to strengthen and rigidify the washer body section, and as shown best in Fig. 2, they also serve to reduce the radial extent of adjacent portions of the peripheral flange 54 so as to strengthen and rigidify the peripheral flange.

While various uses for the fastening unit 20 may suggest themselves, it is especially suitable for securing a workpiece 56 of relatively soft material such as fiber, rubber, plastic or the like to a workpiece or panel 58 as shown in Fig. 4. More specifically, the fastening unit 20 is adapted to accomodate a screw member 60 which is applied from the outer or exposed side of the panel 58 through an aperture 62 in the panel and to the nut member of the fastening unit. The construction of the washer 22 is such that when the screw 60 is tightened, the flange 28 and washer body section 34 will be drawn into and become embedded in the relatively soft workpiece 56. During such tightening of the screw 60 or any subsequent removal of the screw, the substantially flat side portions 42 and 44 of the washer body section serve to interengage with the workpiece 56 and restrain the washer and also the nut member against rotation relative to the work so as to reduce any possibility of the work becoming torn or otherwise injured and also to facilitate application of or removal of the screw member. When the screw member is fully tightened, the relatively large peripheral flange 50 of the washer engages the workpiece 56 so as to spread the clamping pressure over a relatively great area of the workpiece whereby further to minimize any possibility of injury to the workpiece and to prevent the fastener unit from being drawn too far into the soft workpiece. It should be noted that when the fastener unit is fully assembled as shown in Fig. 4, both the nut member and the entering end portion of the screw member are completely housed within the hollow body section 34 of the washer so that there will be no objectionable projecting elements extending beyond the surface of the workpiece 56.

Figs. 5 and 6 show a modified form of the present invention which is similar to the above described structure as indicated by the application of identical reference numerals with the suffix "a" added to corresponding elements. This embodiment differs only in that the elements 46a and 48a for retaining the nut member within the hollow washer body section are in the form of inwardly projecting dimples rather than finger or tab elements. It will be appreciated that such dimples may be formed relatively easily with simple tools.

The fastener unit 20b shown in Figs. 7 and 8 illustrate other modified elements 46b and 48b on the washer for retaining the fastener body and washer in assembled relationship. In this embodiment, the fingers or tabs 46b and 48b are integrally joined to the washer side portions at areas spaced axially outwardly from the fastener or nut body, and the free ends of the fingers or tabs extend generally axially inwardly and engage the nut body. With this embodiment, the retaining fingers or tabs may be formed prior to assembly of the nut within the washer whereupon the nut body may be forced into the hollow washer body section and snapped beneath the retaining fingers.

Figs. 9 and 10 show another modified form of the present invention which is similar to the above described structure as indicated by the application of identical reference numerals with the suffix "c" added to corresponding elements. In this embodiment, the nut body 26c is formed from sheet material and is provided with a flange 66 abutting the flange 28c of the washer and an axially extending tubular portion 68 having its interior surface defined by helical threads 27c. The retaining tabs or fingers 46c and 48c are substantially identical to the corresponding elements 46 and 48 described above, but their axial location on the washer is, of course, modified so as to accommodate the relatively thin flange 66 of the sheet metal nut member. As shown in Fig. 9, the flange 66 of the nut member is provided with a non-circular or hexagonal peripheral configuration so that the flange cooperates with the side portions 38c and 40c of the washer to prevent relative rotation between the washer and the nut member.

While the preferred embodiments of the present invention have been shown and described herein, it is obvious that many structural details may be changed without departing from the spirit and scope of the appended claims.

The invention is claimed as follows:

1. A fastener unit adapted to accommodate a complementary threaded fastener member and to be clamped against a relatively soft workpiece, comprising a helically threaded fastener including a body having a generally radially extending clamping side, and a one-piece sheet material washer including apertured radially extending annular flange means substantially axially aligned with and disposed next to said clamping side and providing said unit with a substantially flat workpiece clamping end, a hollow body section extending generally axially from said flange means toward an end of said fastener body opposite from said clamping end, said fastener body including opposite generally flat peripheral portions, said hollow body section including oppositely disposed generally flat side portions engageable with said generally flat peripheral portions and also engageable with a workpiece for restraining rotation of the washer relative to said fastener body and a workpiece, said flange means and said body section being substantially embedded in one side of a relatively soft workpiece when the fastener unit is operatively associated with a complementary fastener member and clamped against the workpiece, said hollow body section including additional opposite side portions extending between said flat side portions, said additional side portions having curved transverse cross sectional shapes and being flared outwardly from said flange means, said washer including an element overlying an exposed end surface of said fastener body facing oppositely from said clamping end for retaining the washer and the fastener body in assembled relationship, and peripheral annular flange means disposed axially outwardly of said fastener body and extending generally radially outwardly from an end of said hollow body section opposite from said clamping end for restraining undue entry of the fastener unit into a relatively soft workpiece.

2. A fastener unit, as defined in claim 1, wherein said element includes a tab integral with and struck from said washer and extending inwardly over said opposite side of said fastener body.

3. A fastener unit, as defined in claim 2, wherein said tab extends from an integral junction with said hollow body section toward said peripheral flange means and then inwardly over said opposite side of said fastener body.

4. A fastener unit, as defined in claim 2, wherein said tab extends from an integral junction with said washer adjacent said peripheral flange inwardly and toward said opposite side of said fastener body.

5. A fastener unit, as defined in claim 1, wherein said element comprises discrete bulge means projecting inwardly from said hollow body section over said opposite side of said fastener body.

References Cited in the file of this patent

UNITED STATES PATENTS

| | | |
|---|---|---|
| 797,545 | Ette | Aug. 15, 1905 |
| 1,967,145 | Fisher | July 17, 1934 |
| 2,286,950 | Breedlove | June 16, 1942 |
| 2,461,097 | Wallace | Feb. 8, 1949 |
| 2,609,162 | Howsam | Sept. 2, 1952 |

FOREIGN PATENTS

| | | |
|---|---|---|
| 495,976 | Great Britain | Nov. 23, 1930 |
| 585,948 | Great Britain | Mar. 3, 1947 |
| 982,539 | France | Jan. 31, 1951 |